US012138996B2

(12) United States Patent
Okino et al.

(10) Patent No.: US 12,138,996 B2
(45) Date of Patent: Nov. 12, 2024

(54) SEALING MEMBER FOR A DOOR HOLE CAP

(71) Applicant: NISHIKAWA RUBBER CO., LTD., Hiroshima (JP)

(72) Inventors: Fumito Okino, Hiroshima (JP); Taisuke Kameoka, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 0 days.

(21) Appl. No.: 18/215,293

(22) Filed: Jun. 28, 2023

(65) Prior Publication Data

US 2023/0331075 A1    Oct. 19, 2023

Related U.S. Application Data

(63) Continuation of application No. 17/569,124, filed on Jan. 5, 2022, now Pat. No. 12,054,038.

(30) Foreign Application Priority Data

Jan. 12, 2021    (JP) ................... 2021-003036
Sep. 27, 2021    (JP) ................... 2021-156742

(51) Int. Cl.
*B60J 5/04* (2006.01)
*B60J 10/27* (2016.01)
*B60J 10/86* (2016.01)

(52) U.S. Cl.
CPC ........... *B60J 5/0413* (2013.01); *B60J 5/0418* (2013.01); *B60J 10/27* (2016.02); *B60J 10/86* (2016.02)

(58) Field of Classification Search
CPC . B60J 5/0418; B60J 10/87; B60J 10/27; B60J 5/0413; B60J 10/86
See application file for complete search history.

(56) References Cited

U.S. PATENT DOCUMENTS 3,656,260 A    4/1972    Weaver
4,943,109 A    7/1990    Skrbina et al.
(Continued)

FOREIGN PATENT DOCUMENTS

DE          29922990 U1    5/2000
DE    2020/08004547 U1    8/2009
(Continued)

OTHER PUBLICATIONS

Office Action for U.S. Appl. No. 17/569,124, mailed Dec. 23, 2022, 15 pages.
(Continued)

*Primary Examiner* — Gregory J Strimbu
(74) *Attorney, Agent, or Firm* — Casimir Jones, S.C.; Brian F. Bradley

(57) ABSTRACT

A sealing member including a main body having a generally rectangular shape in cross-section and a first sealing member that extends from a first end of the main body in a first direction. The first sealing member is made of a foamed material. The sealing member further includes a groove touch member that extends from a side of the main body in a second direction perpendicular to the first direction; and wherein the groove touch member extends beyond an extent the first sealing member extends in the second direction. The sealing member further includes a lip member positioned at the first end of the main body; and a second sealing member that extends from the lip member.

4 Claims, 10 Drawing Sheets

(56) References Cited

U.S. PATENT DOCUMENTS

| | | | |
|---|---|---|---|
| 5,411,785 | A | 5/1995 | Cook |
| 12,054,038 | B2* | 8/2024 | Okino ................. B60J 5/0418 |
| 2009/0058246 | A1 | 3/2009 | Cittadini |
| 2015/0084288 | A1 | 3/2015 | Arata |
| 2017/0082145 | A1 | 3/2017 | Harada et al. |
| 2018/0093621 | A1 | 4/2018 | Morimoto et al. |
| 2020/0001691 | A1 | 1/2020 | Grella |
| 2021/0053429 | A1 | 2/2021 | Okino et al. |
| 2021/0266662 | A1 | 8/2021 | Honji et al. |
| 2021/0300161 | A1 | 9/2021 | Fortin et al. |
| 2021/0396317 | A1 | 12/2021 | Doman |
| 2022/0153098 | A1* | 5/2022 | Fortin ................. B60J 5/0416 |
| 2022/0219512 | A1 | 7/2022 | Okino |
| 2023/0034614 | A1* | 2/2023 | Okino ................. F16J 15/062 |
| 2023/0219401 | A1* | 7/2023 | Mira Palacios ........ B60J 5/0418 49/501 |
| 2023/0331075 | A1 | 10/2023 | Okino |

FOREIGN PATENT DOCUMENTS

| | | | |
|---|---|---|---|
| EP | 0397300 A2 | 11/1990 | |
| EP | 1241037 A1 * | 9/2002 | ............. B60J 10/16 |
| EP | 1388447 | 2/2004 | |
| JP | 62-192959 U | 12/1987 | |
| JP | 02-256967 A | 10/1990 | |
| JP | 05-054020 U | 7/1993 | |
| JP | 2002-502747 | 1/2002 | |
| JP | 2002-052936 | 2/2002 | |
| JP | 2002-89713 | 3/2002 | |
| JP | 2002-295683 | 10/2002 | |
| JP | 2003-252052 | 9/2003 | |
| JP | 2004-042861 | 2/2004 | |
| JP | 2004-050879 | 2/2004 | |
| JP | 2004-136721 | 5/2004 | |
| JP | 2005-16651 | 1/2005 | |
| JP | 2009-166421 | 7/2009 | |
| JP | 2010-269743 | 12/2010 | |
| JP | 2015-169241 | 9/2015 | |
| JP | 2019-117877 | 7/2019 | |
| JP | 2021/031128 A | 3/2021 | |
| JP | 2022-108254 | 7/2022 | |
| JP | 2022/135783 A | 9/2022 | |
| JP | 2023/015656 A | 2/2023 | |
| WO | WO 2007/147570 | 12/2007 | |

OTHER PUBLICATIONS

Office Action for U.S. Appl. No. 17/569,124, mailed May 31, 2023, 18 pages.

Office Action for U.S. Appl. No. 17/569,124. Jun. 13, 2023. 17 pages.

Office Action for U.S. Appl. No. 17/861,877, dated Sep. 3, 2024, 20 pages, available in Patent Center.

Office Action for U.S. Appl. No. 17/569,124, dated Dec. 29, 2023, 14 pages, available in Patent Center.

* cited by examiner

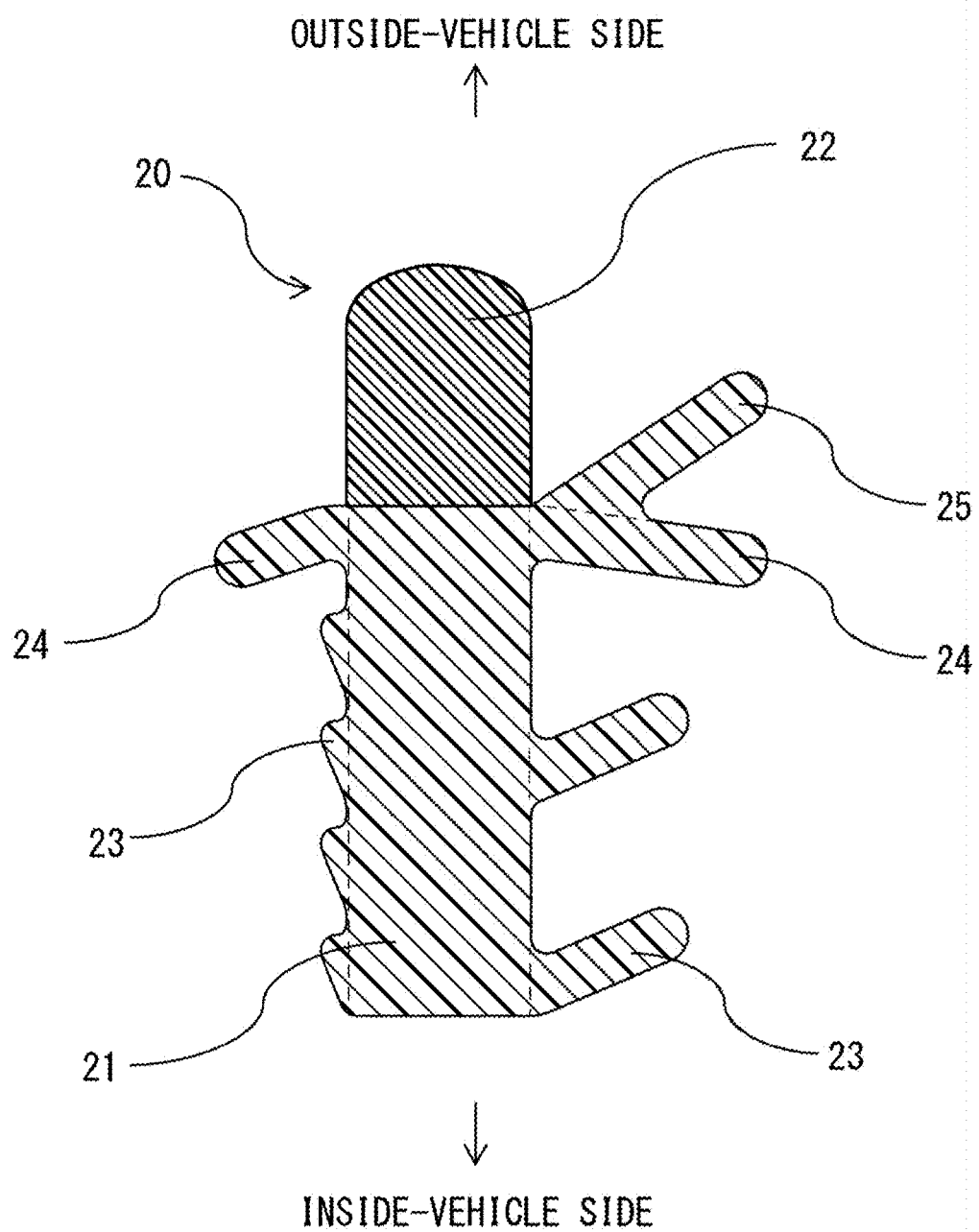

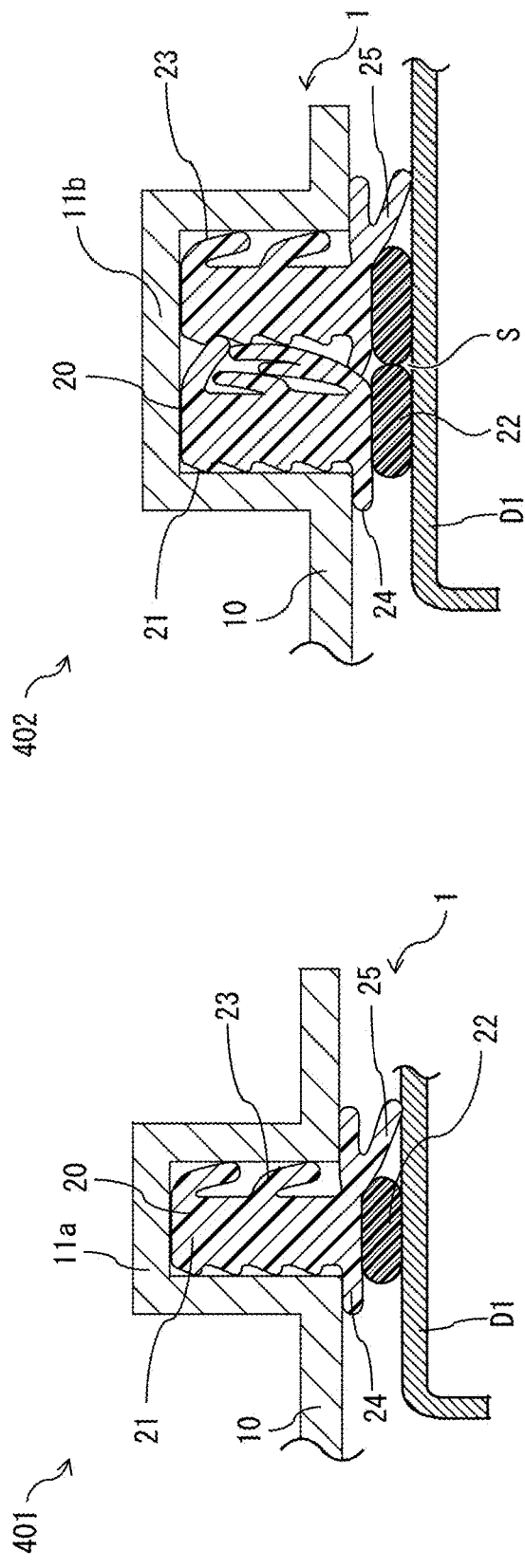
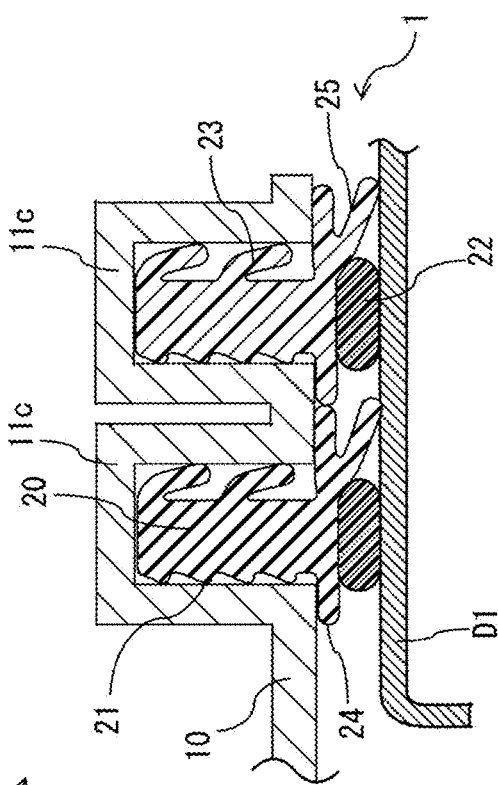
FIG. 4A
FIG. 4B
FIG. 4C

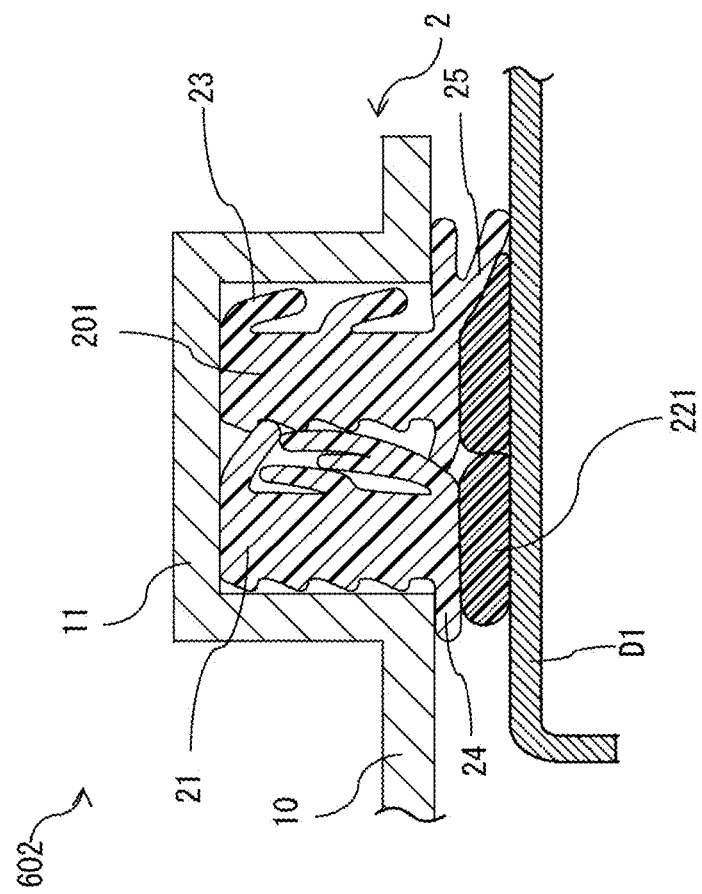
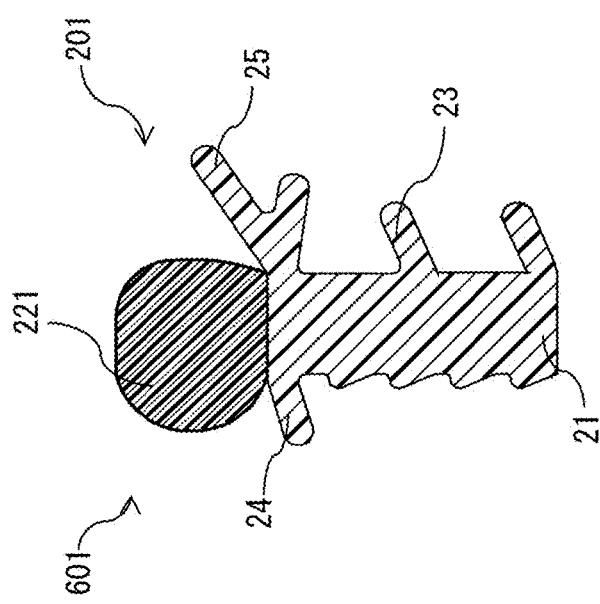

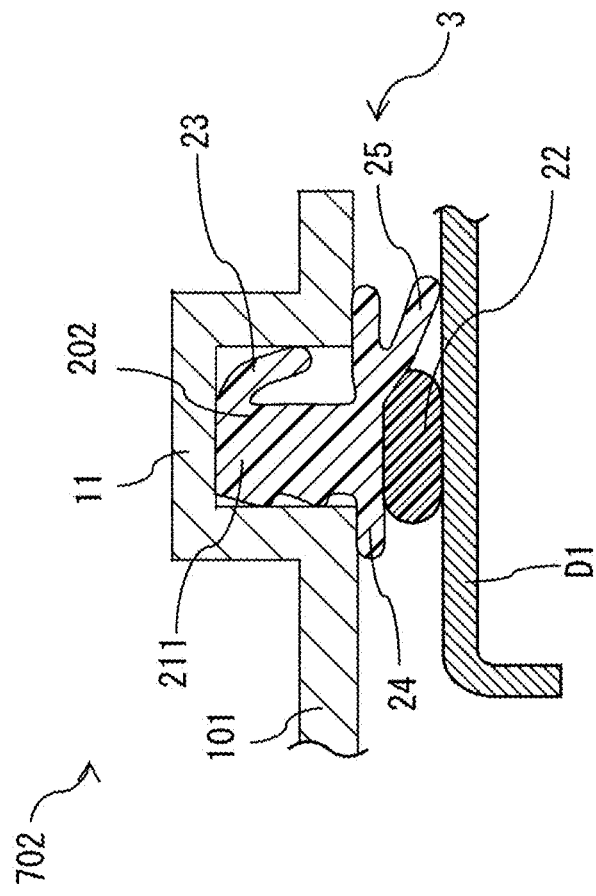
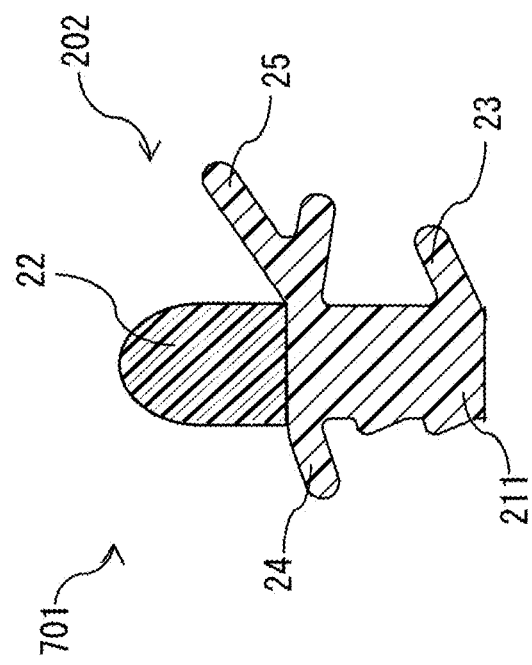

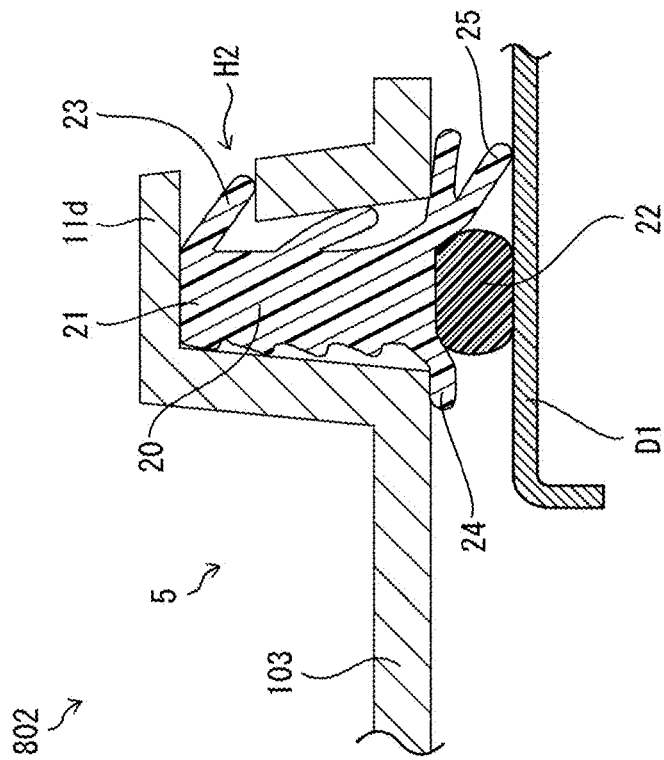
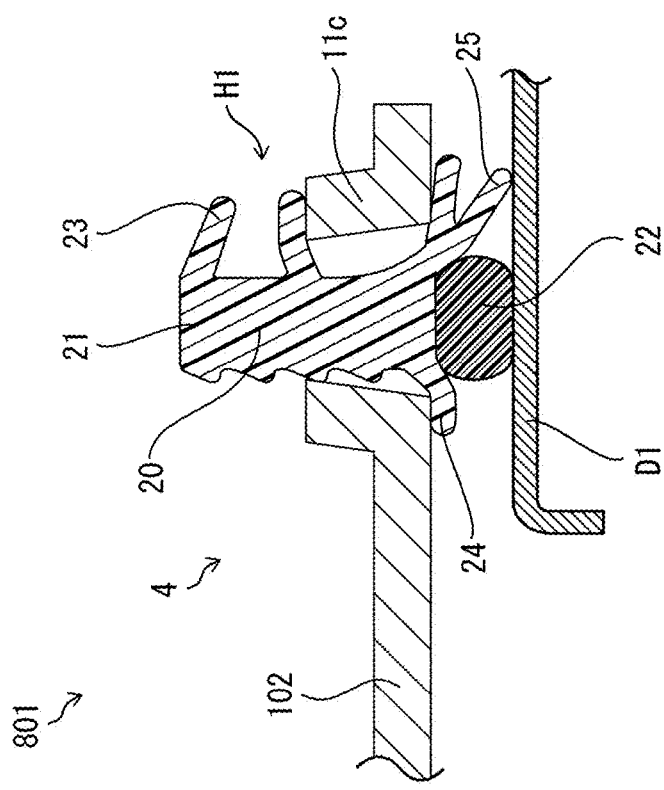

SEALING MEMBER FOR A DOOR HOLE CAP

This application is a Continuation of U.S. application Ser. No. 17/569,124, filed Jan. 5, 2022, which claims priority under 35 U.S.C. § 119 on Patent Applications No. 2021-003036 filed in Japan on Jan. 12, 2021 and No. 2021-156742 filed in Japan on Sep. 27, 2021, the entire contents of which are hereby incorporated by reference.

TECHNICAL FIELD

The present invention relates to a door hole cap and a sealing member.

BACKGROUND ART

Door hole caps have been conventionally used in order to prevent rainwater or the like from entering a vehicle through a door hole formed in a door inner panel of a door of the vehicle. The entry of rainwater or the like is prevented, typically by affixing a spongy material or the like to a peripheral part of a door hole cap. However, affixing a spongy material or the like to a door hole cap takes time and effort in positioning and requires proficiency. This causes an increase in the number of steps required to attach the sealing member to the door hole cap, resulting in an increase in manufacturing costs. Accordingly, there is demand for a door hole cap that makes it possible to both maintain water stopping performance and reduce manufacturing costs.

For example, Patent Literature 1 discloses a resin panel having a foamed sealing material, the resin panel including: a resin panel body having a recessed groove; and a foamed sealing material that has expanded to a surface of the panel body through foaming and curing, in the recessed groove, of a liquid raw material of a foam resin.

CITATION LIST

Patent Literature

[Patent Literature 1]
Japanese Patent Application Publication, Tokukai, No. 2009-166421

SUMMARY OF INVENTION

Technical Problem

According to the resin panel having the foamed sealing material disclosed in Patent Literature 1, the liquid raw material of a foam resin is injected into the recessed groove, and then foamed and cured. In an operation to inject the liquid raw material of a foam resin into the recessed groove, the amount of the injected liquid raw material varies depending on a worker. This may reduce water stopping performance of the resin panel having the foamed sealing material. In addition, time required for foaming and curing the liquid raw material of a foam resin causes an increase in operation time. This results in an increase in manufacturing costs. Further, once the foamed sealing material is formed on the resin panel body, it is impossible to easily remove the foamed sealing material alone. As a result, in a case where a fault occurs only in the foamed sealing material after the foamed sealing material is formed, it is necessary to replace the whole resin panel body. This results in an increase in manufacturing costs.

An aspect of the present invention has been made in light of the above problems. The object of an aspect of the present invention is to provide a door hole cap and a sealing member that make it possible to both maintain water stopping performance of the door hole cap and reduce manufacturing costs.

Solution to Problem

In order to solve the above problems, a door hole cap in accordance with an aspect of the present invention is provided. The door hole cap is to be attached to a door hole that is formed in a door inner panel of a vehicle, the door hole cap comprising: a capping member for covering the door hole from an inside of the vehicle, the capping member having a groove that is recessed toward the inside of the vehicle; and a sealing member to be attached to the groove, the groove being formed along an entire perimeter of a first peripheral part that is a peripheral part of the capping member, the sealing member including a main body section to be inserted into the groove, a first sealing section which extends from an outside-vehicle side end of the main body section toward an outside of the vehicle and which abuts on an inside-vehicle side surface of the door inner panel, and a groove touch section which extends, from a position located further inside the vehicle than the outside-vehicle side end of the main body section, toward at least one inner surface of the groove and which abuts on the at least one inner surface.

A sealing member in accordance with an aspect of the present invention is to be attached to a groove in a door hole cap to be attached to a door hole that is formed in a door inner panel of a vehicle, the groove being formed along an entire perimeter of a first peripheral part and being recessed toward an inside of the vehicle, the first peripheral part being a peripheral part of a capping member for covering the door hole from the inside of the vehicle, the sealing member comprising: a main body section to be inserted into the groove; a first sealing section which extends from an outside-vehicle side end of the main body section toward an outside of the vehicle and which abuts on an inside-vehicle side surface of the door inner panel; and a groove touch section which extends, from a position located further inside the vehicle than the outside-vehicle side end of the main body section, toward at least one inner surface of the groove and which abuts on the at least one inner surface.

Advantageous Effects of Invention

An aspect of the present invention makes it possible to provide a door hole cap and a sealing member that make it possible to both maintain water stopping performance of the door hole cap and reduce manufacturing costs.

BRIEF DESCRIPTION OF DRAWINGS

FIG. 3 is a cross-sectional view illustrating a structure of a sealing member of the door hole cap in accordance with an embodiment.

FIG. 4A is a view illustrating a cross sectional views taken along lines 4A-4A in FIG. 1, illustrating cross sectional shapes of the door hole cap in accordance with an embodiment.

FIG. 4B is a view illustrating a cross sectional views taken along lines 4B-4B in FIG. 1, illustrating cross sectional shapes of the door hole cap in accordance with an embodiment.

FIG. 4C is a view illustrating a cross sectional views taken along lines 4C-4C in FIG. 1, illustrating cross sectional shapes of the door hole cap in accordance with an embodiment.

FIGS. 6A and 6B are cross-sectional views illustrating a structure of a variation of the door hole cap in accordance with an embodiment.

FIGS. 7A and 7B are cross-sectional views illustrating a structure of another variation of the door hole cap in accordance with an embodiment.

FIGS. 8A and 8B are cross-sectional views illustrating a structure of still another variation of the door hole cap in accordance with an embodiment.

DESCRIPTION OF EMBODIMENTS

<Overview of Door Hole Cap 1 and Example of Attachment of Door Hole Cap 1>

Figure 1:
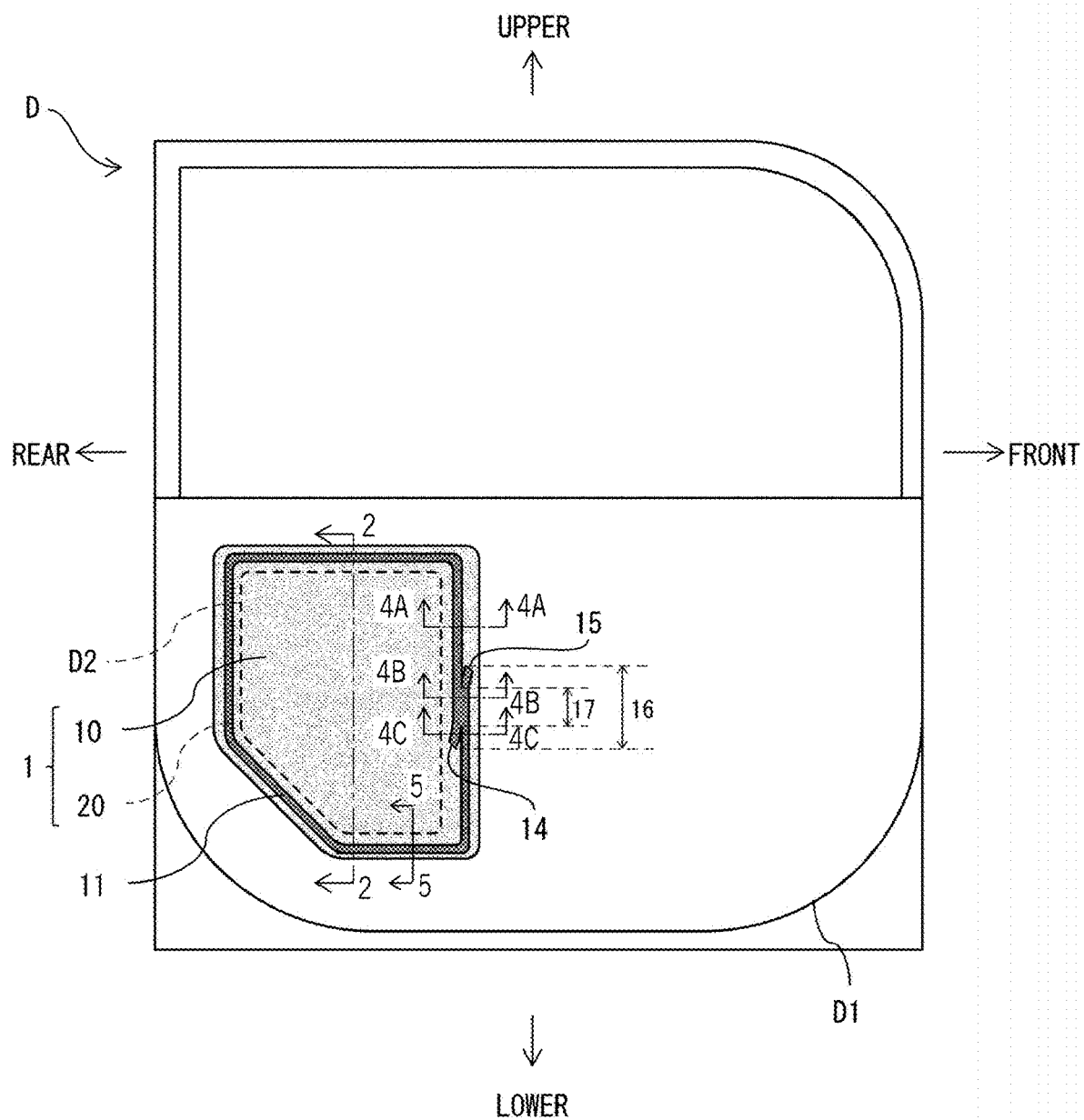
FIG. 1 is a view illustrating a structure of a front door to which a door hole cap in accordance with an embodiment is attached, as viewed from the inside of a vehicle.

The following description will discuss an overview of a door hole cap 1 and an example of attachment of the door hole cap 1 in accordance with an embodiment of the present invention, with reference to FIG. 1. In an example in FIG. 1, the upper side, the lower side, the right side, the left side, the near side, and the far side of a drawing sheet of FIG. 1 correspond respectively to the upper side, the lower side, the front side, the rear side, an inside-vehicle side (the inside of a vehicle), and an outside-vehicle side (the outside of a vehicle) of a vehicle. Note that FIG. 1 is a view of a front door D as viewed from the inside of the vehicle. However, this manner of viewing does not pose any limitation on a direction from which the door hole cap 1 is attached to the vehicle. The door hole cap 1 can be attached to the vehicle from any direction.

A front door D is an example of a door of the vehicle, and is attached, to an opening (not illustrated) for a front door of the vehicle, in a manner that allows the front door D to open and close. The front door D includes a door outer panel (not illustrated) and a door inner panel D1. The door inner panel D1 has a door hole D2. The door hole D2 is an opening through which a worker puts the hand, a tool, etc. to, for example, repair various parts disposed inside the front door D. Note that the manner, illustrated in FIG. 1, of forming the front door D is merely an example. The number of the door holes D2 and the location of the door hole D2 can be changed to any number and any location as needed.

The door inner panel D1 includes the door hole cap 1 attached to an inside-vehicle side surface of the door inner panel D1. Blocking, with the door hole cap 1, the door hole D2 from the inside of the vehicle prevents entry, into the vehicle through the door hole D2, of rainwater or the like that has entered the inside of the front door D through a gap between door glass of the vehicle (not illustrated) and a beltline outer weather strip (not illustrated) attached to the door outer panel.

The door hole cap 1 includes a capping member 10 and a sealing member 20, as illustrated in FIG. 1. The capping member 10 has a groove 11 that is recessed toward the inside of the vehicle. The capping member 10 is attached to the door inner panel D1 so as to cover the door hole D2 from the inside of the vehicle. The sealing member 20 is attached to the groove 11 and abuts on the inside-vehicle side surface of the door inner panel D1. This prevents rainwater or the like from entering the vehicle through the door hole D2.

The above-described manner of attaching the door hole cap 1 is merely an example. For example, a door of the vehicle to which the door hole cap 1 is attached is not limited to the front door D illustrated in the example in FIG. 1. Any kind of door can be used provided that the door is a door of a vehicle. The door hole cap 1 can therefore be attached to, for example, a rear door or a sliding door (not illustrated). Further, the door hole cap 1 is attached to any kind of vehicle. Examples of the vehicle to which the door hole cap 1 is to be attached include a sedan, a hardtop vehicle, and a convertible.

<Structure of Door Hole Cap 1>

Figure 2:
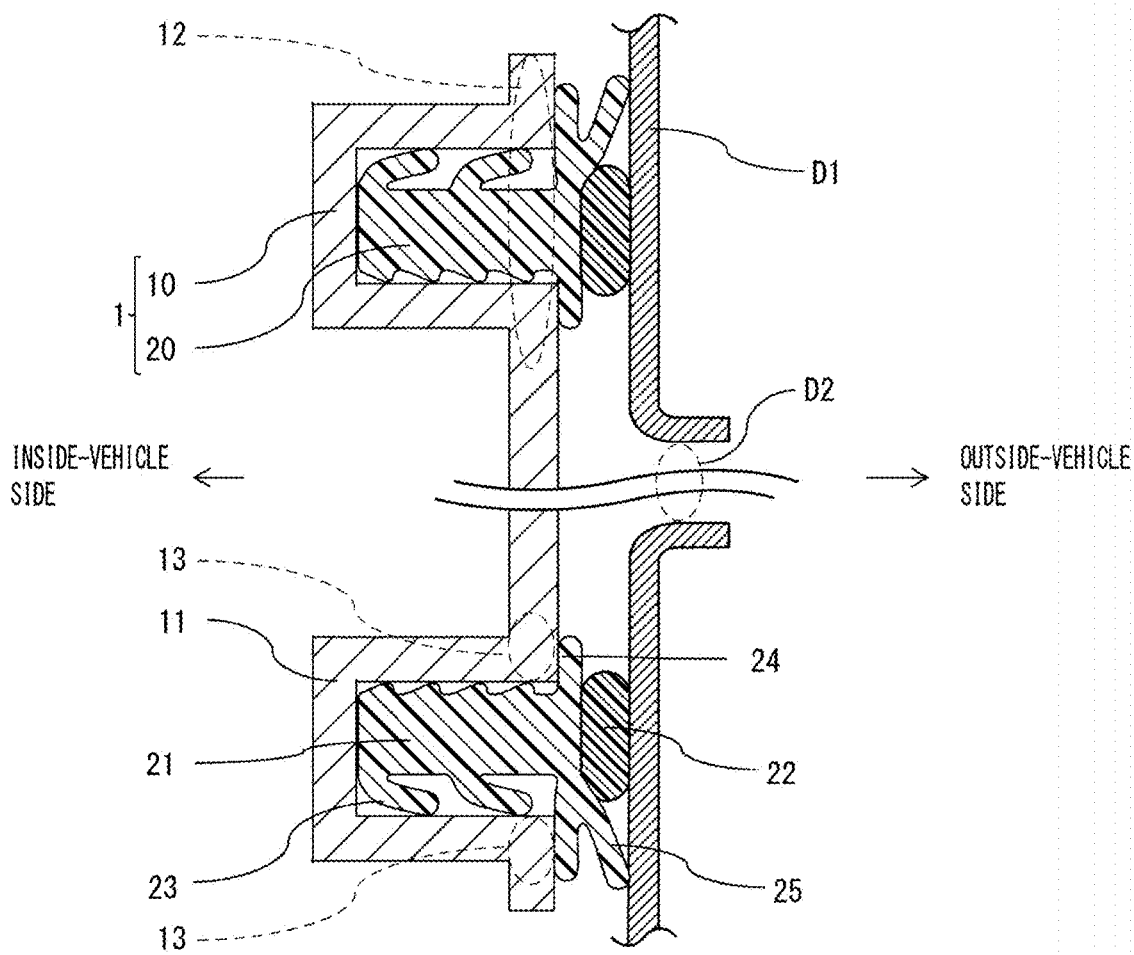
FIG. 2 is a cross-sectional view taken along line 2-2 in FIG. 1, the cross-sectional view illustrating a cross sectional shape of the door hole cap in accordance with an embodiment.

The following description will discuss a structure of the door hole cap 1 with reference to FIG. 2. FIG. 2 is a cross-sectional view, taken along line 2-2, of the door hole cap 1 attached to the door inner panel D1 illustrated in FIG. 1. Therefore, in an example in FIG. 2, the upper side, the lower side, the right side, the left side, the near side, and the far side of a drawing sheet of FIG. 2 correspond respectively to the upper side, the lower side, the outside-vehicle side (the outside of the vehicle), the inside-vehicle side (the inside of the vehicle), the front side, and the rear side of the vehicle.

As illustrated in FIG. 2, the door hole cap 1 has a structure in which the sealing member 20 is inserted in the groove 11 that is formed in a first peripheral part 12, which is a peripheral part of the capping member 10. The groove 11 is formed along an entire perimeter of the first peripheral part 12. When the door hole cap 1 is attached to the door inner panel D1, the door hole cap 1 covers the door hole D2 from the inside of the vehicle, and the sealing member 20 abuts on the inside-vehicle side surface of the door inner panel D1, the inside-vehicle side surface facing the first peripheral part 12.

When seen from the lateral side of the vehicle, the capping member 10 has a shape similar to that of the door hole D2, and is somewhat larger than the door hole D2. As illustrated in FIGS. 1 and 2, since the sealing member 20 is attached to the first peripheral part 12, the sealing member 20 has such a structure as to surround the door hole D2.

Examples of a material of the capping member 10 can include vulcanized rubber, a thermoplastic elastomer, a thermoplastic resin, and metal. Examples of the vulcanized rubber can include an ethylene-propylene-dien rubber (EPDM), isoprene rubber (IR), chloroprene rubber (CR), styrene-butadiene rubber (SBR), and acrylonitrile-butadiene rubber (NBR). Examples of the thermoplastic elastomer can include a thermoplastic olefinic elastomer (TPO) and a thermoplastic styrenic elastomer (TPS). Examples of the thermoplastic resin can include polyethylene (PE), polypropylene (PP), polyvinyl alcohol (PVA), polyvinyl chloride (PVC), polystyrene (PS), acrylonitrile butadiene styrene (ABS), and ethylene-vinyl acetate (EVA). Examples of a composite can include a fiber composite such as a fiberglass blend. Examples of the metal can include aluminum and iron.

<Structure of Sealing Member 20>

The following description will discuss the structure of the sealing member 20 with reference to FIGS. 2 and 3. Note that FIG. 3 is a magnified cross-sectional view of the sealing member 20. In an example in FIG. 3, the upper side and the lower side of a drawing sheet of FIG. 3 correspond respectively to the outside-vehicle side (the outside of the vehicle) and the inside-vehicle side (the inside of the vehicle). In the present embodiment, the sealing member 20 includes a main body section 21, a first sealing section 22, groove touch sections 23, lip sections 24, and a second sealing section 25, as illustrated in FIG. 3.

The main body section 21 is to be inserted into the groove 11. The main body section 21 is formed so as to have a length equal to or greater, in a direction from the outside of the vehicle to the inside, than the depth of the groove 11 when being inserted in the groove 11. The first sealing section 22 extends from an outside-vehicle side end of the main body section 21 toward the outside of the vehicle and abuts on the inside-vehicle side surface of the door inner panel D1. The groove touch sections 23 having a lip shape each extend, from a position located further inside the vehicle than the outside-vehicle side end of the main body section 21, toward at least one inner surface of the groove 11. The groove touch sections 23 abut on the at least one inner surface of the groove 11.

In the present embodiment, the groove touch sections 23 extend from respective positions toward both inner surfaces of the groove 11, as illustrated in FIG. 2. However, the present invention is not limited to this. The groove touch sections 23 only need to extend toward at least one of both inner surfaces of the groove 11. When the groove touch sections 23 abut on the at least one inner surface of the groove 11, it is possible to firmly attach the sealing member 20 to the groove 11.

The groove touch sections 23 extend toward the inner surface of the groove 11 in such a manner as to incline toward the outside of the vehicle. This makes the groove touch sections 23 likely to be elastically deformed so as to bend toward the outside of the vehicle when the sealing member 20 is inserted into the groove 11. Accordingly, the groove touch sections 23 are less likely to interfere with the insertion of the sealing member 20 into the groove 11. Conversely, the groove touch sections 23 are less likely to bend toward the inside of the vehicle. This makes the sealing member 20 less likely to slip out of the groove 11. Therefore, the groove touch sections 23 make it possible to prevent the sealing member 20 from accidentally slipping out of the groove 11.

Even in a case where the groove touch sections 23 extends from respective positions of the main body section 21 toward the inner surfaces of the groove 11 as illustrated in FIG. 2, it is also possible to both give the sealing member 20 a shape that makes the sealing member 20 even less likely to slip off the groove 11 and keep the sealing member 20 easily insertable into the groove 11.

When the sealing member 20 includes the main body section 21, the first sealing section 22, and the groove touch sections 23, attachment of the sealing member 20 to the capping member 10 is completed only by a simple and easy operation of inserting the sealing member 20 into the groove 11 of the capping member 10. In conventional cases in which a spongy material or the like as a sealing member is affixed to the door hole cap, operations including positioning and bonding are needed. In contrast, the present invention eliminates the need to perform such operations, thereby reducing the manufacturing costs of the door hole cap 1.

Additionally, the first sealing section 22 abutting on the door inner panel D1 prevents entry of rainwater or the like from the outside of the vehicle to the inside through the door hole D2. The sealing member 20 has a structure so as to surround the door hole D2, and the first sealing section 22 abuts on the door inner panel D1, at the circumference of the door hole D2. The door hole cap 1 in the present embodiment of the present invention therefore makes it possible to both maintain water stopping performance and reduce the manufacturing costs.

As illustrated in FIG. 2, the sealing member 20 can include the lip sections 24. The lip sections 24 extend from the outside-vehicle side end of the main body section 21 toward respective second peripheral parts 13 that are peripheral parts on both sides of the groove 11. The lip sections 24 abut on the respective second peripheral parts 13 from a direction of the outside of the vehicle. When the lip sections 24 abut on the respective second peripheral parts 13 on both sides of the groove 11 from the direction of the outside of the vehicle, the groove 11 is kept covered by the lip sections 24. This makes it possible for the lip sections 24 to prevent entry of rainwater or the like into the groove 11, thereby reducing entry of the rainwater or the like into the vehicle through the groove 11. As a result, the sealing member 20 that has the lip sections 24 improves water stopping performance of the door hole cap 1 in comparison with the sealing member 20 that does not have the lip sections 24.

When the lip sections 24 abut on the respective second peripheral parts 13 on both sides of the groove 11, the lip sections 24 structurally support, from two directions, the sealing member 20 attached to the groove 11. Consequently, the sealing member 20 that has the lip sections 24 is capable of being attached to the groove 11 in a more stable position than is the sealing member 20 that does not have the lip sections 24.

As illustrated in FIG. 2, the sealing member 20 further includes the second sealing section 25. The second sealing section 25 of the sealing member 20 extends from one of the lip sections 24, the one being closer to an edge of the door hole cap 1. More specifically, the second sealing section 25 extends from a position on the one of the lip sections 24 that is closer to the edge than the other, the position being closer to the main body section 21 than is the tip of the one of the lip sections 24, and extends toward the inside-vehicle side surface of the door inner panel D1. The second sealing section 25 abuts on the inside-vehicle side surface of the door inner panel.

When the sealing member 20 includes the second sealing section 25 that abuts on the door inner panel D1, both the first sealing section 22 and the second sealing section 25 make it possible to effectively prevent rainwater or the like from entering the vehicle after reaching the sealing member 20. The sealing member 20 that has the second sealing section 25 therefore enables improves stop performance of the door hole cap 1 in comparison with the sealing member 20 that does not have the second sealing section 25.

Further, the second sealing section 25 extends from one of the lip sections 24. When the second sealing section 25 abuts on the door inner panel D1, a force exerted in a direction from the door inner panel D1 to the inside of the vehicle acts on the lip sections 24 via the second sealing section 25. This causes the lip sections 24 to be firmly pressed against the second peripheral parts 13 from the direction of the outside of the vehicle. It is therefore possible to effectively prevent rainwater or the like from entering through the groove 11.

The sealing member 20 is constituted by parts that can be made mainly of, for example, vulcanized rubber, a thermoplastic elastomer, or a thermoplastic resin. Examples of a material that can be used for the vulcanized rubber include EPDM, isoprene rubber (IR), chloroprene rubber (CR), styrene-butadiene rubber (SBR), and acrylonitrile-butadiene rubber (NBR). Examples of a material that can be used for the thermoplastic elastomer include a thermoplastic olefinic elastomer (TPO) and a thermoplastic styrenic elastomer (TPS). Examples of a material that can be used for the thermoplastic resin include polyethylene (PE), polypropylene (PP), ethylene-vinyl acetate copolymer (EVA), and soft polyvinyl chloride. These materials can each be solid, spongy by foaming, or in a mixed state where a part of the material is spongy by foaming and the remainder is solid.

The first sealing section 22 can be formed so as to be softer than the main body section 21. The concept of the term "soft" as used herein includes an aspect in which a changeable form such as a hollow form is formed, in addition to an aspect in which a material itself is soft. In a case where the first sealing section 22 is softer than the main body section 21, when the first sealing section 22 is pressed against the door inner panel D1, the first sealing section 22, which is flexible, easily comes into close contact with the door inner panel D1. Further, since the main body section 21 is less flexible than the first sealing section 22, the main body section 21 is less likely to be deformed. This makes it possible to easily keep the sealing member 20 stably attached to the groove 11. It is therefore possible for the door hole cap 1 to stably deliver high water stopping performance.

The first sealing section 22 can mainly be made of the same material as the sealing member 20 is. In that case, it is preferable to make the main body section 21 solid and make the first sealing section 22 spongy by foaming. For example, the first sealing section 22 is particularly preferably made of a highly-foamed EPDM.

The sealing member 20 can be manufactured by extrusion molding. Manufacturing the sealing member 20 by extrusion molding, in comparison with other manufacturing methods including die-molding, makes it possible to more easily and more inexpensively manufacture the first sealing section 22 and the main body section 21, when, for example, the first sealing section 22 and the main body section 21 are manufactured by using different materials. However, the present invention is not limited to this, and the sealing member 20 can be manufactured by conventional, well-known manufacturing methods.

<Structure of Groove 11>

The following description will discuss a structure of the groove 11 of the capping member 10 with reference to FIGS. 1 and 4A-4C. The reference sign 401 of FIG. 4A indicates a cross-sectional view, taken along line 4A-4A, of the door hole cap 1 having been attached to the door inner panel D1 illustrated in FIG. 1. The reference sign 402 of FIG. 4B indicates a cross-sectional view, taken along line 4B-4B, of the door hole cap 1 having been attached to the door inner panel D1 illustrated in FIG. 1. The reference sign 403 of FIG. 4C indicates a cross-sectional view, taken along line 4C-4C, of the door hole cap 1 having been attached to the door inner panel D1 illustrated in FIG. 1. In an example in FIGS. 4A-4C, the upper side, the lower side, the right side, the left side, the near side, and the far side of a drawing sheet of FIGS. 4A-4C correspond respectively to the inside-vehicle side (the inside of the vehicle), the outside-vehicle side (the outside of the vehicle), the front side of the vehicle, the rear side of the vehicle, the lower side of the vehicle, and the upper side of the vehicle.

In the present embodiment, as a part of the groove 11, a paralleling part 16 is formed in the groove 11. As illustrated in FIG. 1, the paralleling part 16 includes one end part 14 and the other end part 15 of the groove 11 that face each other and that are arranged in parallel in a plane in which the groove 11 of the capping member 10 is formed. The paralleling part 16 includes, as a part thereof, a wide part 17 in which the one end part 14 and the other end part 15 are connected to each other. The groove 11 is therefore wider at the wide part 17 than at the remainder of the groove 11. The specific description will follow.

The reference sign 401 of FIG. 4A indicates a cross-sectional view of the door hole cap in which the sealing member 20 is inserted in an area 11a of the groove 11, the area 11a being an area other than the paralleling part 16. The area 11a of the groove 11 has a groove which is capable of receiving the sealing member 20 in a single row and which has a width suitable for an insertion of the sealing member 20 in a single row. The reference sign 402 of FIG. 4B indicates a cross-sectional view of the door hole cap in which the sealing member 20 is inserted in an area 11b of the groove 11, the area 11b being the wide part 17. The area 11b of the groove 11 has a groove which is capable of receiving the sealing member 20 in two rows and which has a width suitable for an insertion of the sealing member 20 arranged in two rows. The reference sign 403 of FIG. 4C indicates a cross-sectional view of the door hole cap in which the sealing member 20 is inserted in an area 11c of the groove 11, the area 11c being both end parts of the paralleling part 16. The area 11c of the groove 11 has grooves, arranged in parallel, each of which is capable of receiving the sealing member 20 in a single row and each of which has a width suitable for an insertion of the sealing member 20 in a single row.

In a case where the capping member 10 includes, as a part of the groove 11, the paralleling part 16 described above, it is possible to surely attach the sealing member 20 along the entire perimeter of the first peripheral part 12. In a case where the capping member 10 does not include the paralleling part 16, the groove 11 formed along the entire perimeter of the first peripheral part 12 only has a width of the area 11a in an example indicated by the reference sign 401 of FIG. 4A, throughout the groove 11. In this case, when the sealing member 20 is inserted in the groove 11, the sealing member 20 which has a shorter length due to manufacturing variations makes it impossible for both ends of the sealing member 20 to abut on each other, thereby reducing water-tightness. This may cause the first peripheral part 12 to have a portion which is poorly sealed by the sealing member 20.

Conversely, in a case where the paralleling part 16 is formed in the capping member 10, the groove 11 partially has a width of the area 11b in an example indicated by the reference sign 402 of FIG. 4B. The capping member 10 can include an area in which the grooves 11 are arranged in parallel as in the area 11c in an example indicated by the reference sign 403 of FIG. 4C. As a result, even when manufacturing variations occur in the sealing member 20, both end portions of the sealing member 20 are partially attached to the paralleling part 16 in parallel. This makes it possible to prevent the first peripheral part 12 from having the poorly sealed portion.

Further, in the present embodiment, the wide part 17 includes the area 11b, which is wider, of the groove 11, whereas both end parts of the paralleling part 16 include the area 11c in which two grooves 11 are arranged in parallel. In this context, the wide part 17 receives the sealing member 20 arranged in two rows inside a single groove 11. This may form, along the groove 11, a passage S that is surrounded by the sealing member 20 arranged in two rows and the door inner panel D1 and that is tubular and extremely narrow.

For example, in a case where an end part (the one end part 14 in the present embodiment), on the lower side of the vehicle, of the groove 11 is serving as the wide part 17, the passage S formed in the one end part 14 is likely to be exposed to rainwater or the like. When exposed to rainwater or the like, the passage S sucks, by capillary action, the rainwater or the like, so that the rainwater or the like may enter the vehicle. Conversely, in a case where the area 11c is formed in a part, on the lower side of the vehicle, of the paralleling part 16, the passage S formed in the one end part 14 is located so as to be further on the upper side of the vehicle than a lower end of the sealing member 20 that is on the door hole D2 side. This makes the passage S less likely to be exposed to rainwater or the like, thereby enabling a reduction in a possibility of entry, by capillary action, of the rainwater or the like into the groove 11. This configuration improves water stopping performance of the door hole cap 1 in comparison with the configuration in which the wide part 17 is formed, by the grooves 11 connected together, throughout the paralleling part 16.

Note that the present invention is not limited to the above-described structure of the groove 11, and the groove 11 only needs to be formed along the entire perimeter of the first peripheral part 12.

<Drainage Structure>

Figure 5:
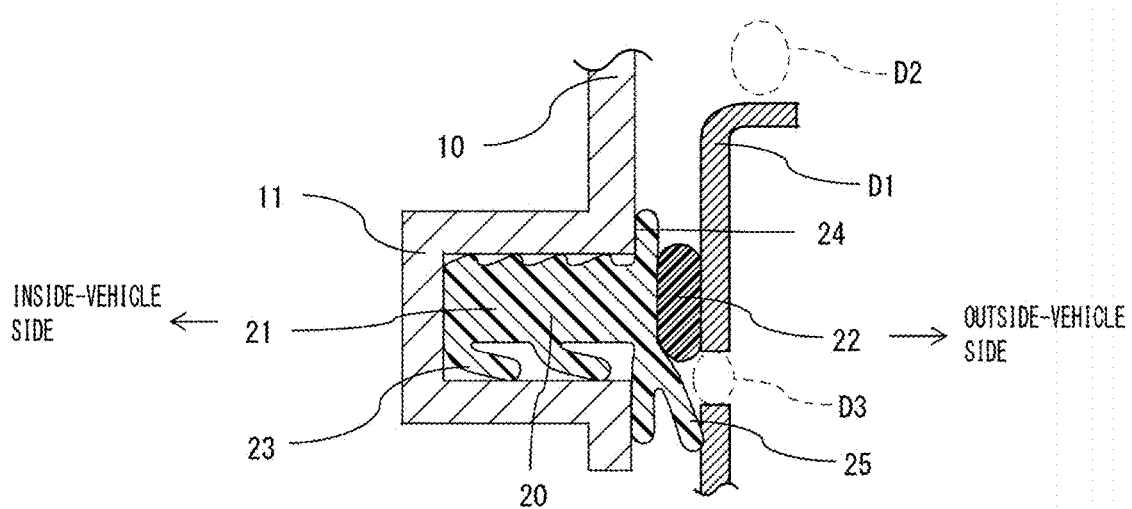
FIG. 5 is a cross sectional view taken along line 5-5 in FIG. 1, the cross sectional view illustrating a cross sectional shape of the door hole cap in accordance with an embodiment.

The following description will discuss a drainage structure with reference to FIG. 5. FIG. 5 is a cross-sectional view, taken along line 5-5, of the door hole cap 1 attached to the door inner panel D1 illustrated in FIG. 1. Accordingly, in an example in FIG. 5, the upper side, the lower side, the right side, the left side, the near side, and the far side of a drawing sheet of FIG. 5 correspond respectively to the upper side, the lower side, the outside-vehicle side (the outside of the vehicle), the inside-vehicle side (the inside of the vehicle), the front side, and the rear side of the vehicle.

In the present embodiment, the door hole cap 1 can have a drainage structure for draining water through a space between the first sealing section 22 and the second sealing section 25, as illustrated in FIG. 5. Specifically, the door inner panel D1 can have a drain hole D3 below the door hole D2. With the drain hole D3, even when rainwater or the like that has reached the first sealing section 22 from the door hole D2 enters the space between the first sealing section 22 and the second sealing section 25, the rainwater or the like moves to a lower part of the door inner panel D1 by gravity, and is then drained through the drain hole D3. That is, the drain hole D3 form a drainage structure, together with the first sealing section 22 and the second sealing section 25 that are formed so as to be apart from each other. This structure enables improved water stopping performance of the door hole cap 1.

[Variation]

(Variation of Sealing Member 20)

There are more than one possible variation of the door hole cap 1 and of the sealing member 20 in accordance with the present embodiment. The following description will discuss respective variations of the door hole cap 1 and the sealing member 20 in accordance with the present embodiment, with respect to FIGS. 6A-6B and 7A-7B. A reference sign 601 of FIG. 6A indicates a cross-sectional view of a sealing member 201 in accordance with a variation of the present invention. A reference sign 701 of FIG. 7A indicates a cross-sectional view of a sealing member 202 in accordance with the variation of the present invention. A reference sign 602 of FIG. 6B indicates a cross-sectional view of a door hole cap 2 in accordance with the variation of the present invention. A reference sign 702 of FIG. 7B indicates a cross-sectional view of a door hole cap 3 in accordance with the variation of the present invention.

In an example indicated by the reference sign 601 of FIG. 6A and an example indicated by the reference sign 701 of FIG. 7A, the upper side and the lower side of drawing sheets of FIGS. 6A and 7A correspond respectively to the outside-vehicle side (the outside of the vehicle) and the inside-vehicle side (the inside of the vehicle). In an example indicated by the reference sign 602 of FIG. 6B and an example indicated by the reference sign 702 of FIG. 7B, the upper side, the lower side, the right side, the left side, the near side, and the far side of drawing sheets of FIGS. 6B and 7B correspond respectively to the inside-vehicle side (the inside of the vehicle), the outside-vehicle side (the outside of the vehicle), the front side of the vehicle, the rear side of the vehicle, the lower side of the vehicle, and the upper side of the vehicle.

As illustrated in the example indicated by the reference sign 601 of FIG. 6A, the sealing member 201 differs from the sealing member 20 in the shape of the first sealing section 221. As illustrated in the example indicated by the reference sign 602 of FIG. 6B, the first sealing section 221 has a larger cross section than the first sealing section 22 of the sealing member 20. This results in an increased area of contact between the first sealing section 221 and the door inner panel D1. This configuration makes it difficult for rainwater or the like to enter the inside of the vehicle through the first sealing section 221, and thus enables an improved water stopping performance of the door hole cap 2. Further, as illustrated in the example indicated by the reference sign 602 of FIG. 6B, when the sealing member 201 arranged in two rows is inserted in the groove 11 in the wide part 17, it is possible to achieve a structure in which a gap is less likely to be formed between the two rows of the sealing member 201. This enables an improved water stopping performance of the door hole cap 2.

As illustrated in the example indicated by the reference sign 701 of FIG. 7A, the sealing member 202 differs from the sealing member 20 in the shape of the main body section 211. When the main body section 211 has a length smaller, in a direction from the outside of the vehicle to the inside, than that of the main body section 21 of the sealing member 20, the amount of a material required for the manufacture of the sealing member 202 is reduced. This enables reduced manufacturing costs of the door hole cap 3. Further, as illustrated in the example indicated by the reference sign 702 of FIG. 7B, since the main body section 211 of the sealing member 202 has a short length in cross section, it is possible to make the groove 11 of the capping member 101 short in depth. This reduces the amount of the material required for the manufacture of the capping member 101, and thus enables reduced manufacturing costs of the door hole cap 3. Moreover, the sealing member 202 becomes easy to insert deeply into the groove 11.

(Variation of Groove 11)

Figure 9:
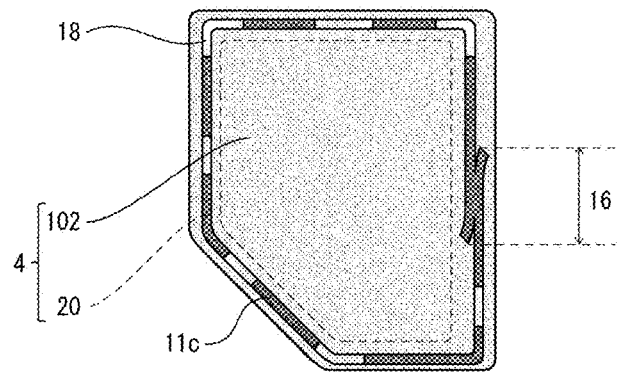
FIG. 9 is a view illustrating positions of fixing areas in which a through hole is formed in the variation of the door hole cap illustrated in FIGS. 8A and 8B.

The following description will discuss a variation of the groove 11 of the door hole cap 1 in accordance with the present embodiment with reference to FIGS. 8A, 8B, and 9.

A reference sign 801 of FIG. 8A indicates a cross-sectional view, taken along a line at a position similar to that of line 4A-4A in FIG. 1, of a door hole cap 4 in accordance with a variation of the present invention. A reference sign 802 of FIG. 8B indicates a cross-sectional view, taken along a line at a position similar to that of line 4A-4A in FIG. 1, of a door hole cap 5 in accordance with the variation of the present invention.

As illustrated in an example indicated by the reference sign 801 of FIG. 8A, the door hole cap 4 differs from the door hole cap 1 in that the door hole cap 4 includes a capping member 102 that has a groove 11c in which a through hole H1 is formed. The through hole H1 is formed by cutting away a part of the groove 11 that is approximately half the depth of the groove 11c and that is on the bottom side. When the sealing member 20 is inserted in the groove 11c thus formed, at least some of the groove touch sections 23 are inserted in the through hole H1. The groove touch sections 23 inside the through hole H1 are locked by a circumferential wall of the through hole H1 even when the sealing member 20 is on the verge of slipping out. Therefore, the groove 11c of the door hole cap 4 preferably has, in at least a part thereof, the through hole H1 into which at least some of the groove touch sections 23 are inserted.

In some cases, the groove 11c is made into a taper shape that is narrower toward the bottom, so that a molding die easily slips out of the groove 11c during manufacture. In such cases, as with the molding die, the sealing member 20 easily slips out of the groove 11c. However, since the groove 11c has the through hole H1, the groove touch sections 23 are locked by the circumferential wall of the through hole H1. This makes it possible to prevent the sealing member 20 from slipping out of the groove 11c.

As illustrated in FIG. 9, it is preferable to provide a plurality of fixing areas 18 in the groove 11c of the door hole cap 4. The fixing areas 18 are so configured that the sealing member 20 is easily fixed to the groove 11c. In the door hole cap 4, the through hole H1 is formed in the fixing areas 18. The fixing areas 18 are preferably located in the periphery of the door hole cap 4 not only at straight sections in which the groove 11c is formed in a straight manner but also at corner sections in which the groove 11c is formed in a bending manner. At such corner sections, the sealing member 20 is less likely to be stably received in the groove 11c. It is therefore preferable to give the corner sections a structure which makes the sealing member 20 especially less likely to slip out of the groove 11c.

The fixing areas 18 can have a through hole H2 formed only in a part which is so tight that, when the sealing member 20 is inserted deeply into the groove 11d, any one of the groove touch sections 23 abuts on the part, as can be seen in the door hole cap 5 illustrated in an example of the reference sign 802 of FIG. 8B. With the through hole H2 thus formed, it is also possible to cause the groove touch section 23 to be well locked by the circumferential wall of the through hole H2. This makes the sealing member 20 less likely to slip out of the groove 11d having the through hole H2.

Alternatively, in a variation of the door hole cap 1, the fixing areas 18 can be formed so as to be less wide than the other areas, instead of having a through hole. When the groove 11 is less wide, it is more difficult for the sealing member 20 that is inserted in the groove 11 to slip out of the groove 11. In this case, with a configuration in which the fixing areas 18 are not provided along an entire perimeter of the door hole cap 1 but are discontinuously provided at a plurality of locations, it is possible to both eliminate the need for excessively applying force to insert the sealing member 20 and make the sealing member 20 less likely to slip out of the groove 11.

Alternatively, in a variation of the door hole cap 1, the groove 11 in the fixing areas 18 can have a side wall inner surface of the groove 11, the side wall inner surface having a part which abuts on at least some of the groove touch sections 23 and which has a greater friction coefficient than the other parts. For example, in the fixing areas 18, the side wall inner surface that abuts on the groove touch sections 23 can have been subjected to a process for reducing flatness such as graining or texturing. This configuration also causes the groove touch sections 23 that abut on the side wall inner surface of the groove 11 to be less likely to slide on the side wall inner surface and thus makes the sealing member 20 less likely to slip out of the groove 11.

Example Application

Figure 10:
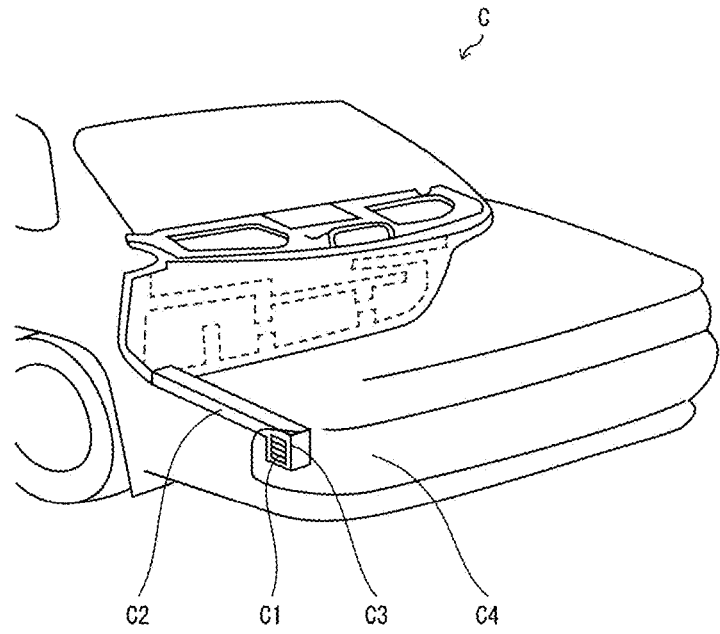
FIG. 10 is a view illustrating how an air outlet in accordance with an example application is attached.
Figure 11A:
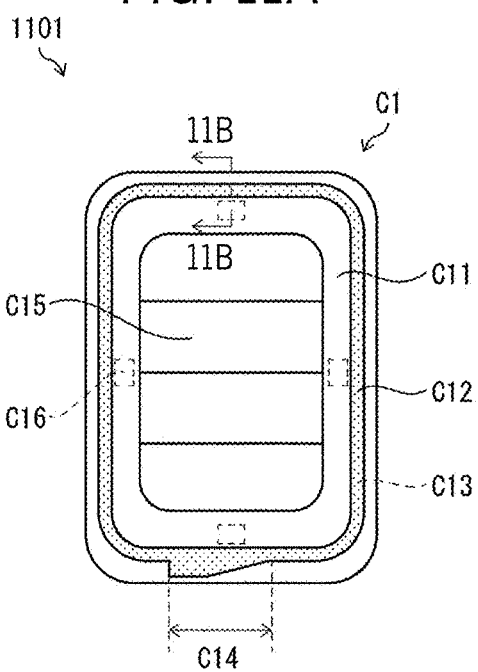
FIG. 11A is a view illustrating a structure of the air outlet in accordance with the example application.
Figure 11B:
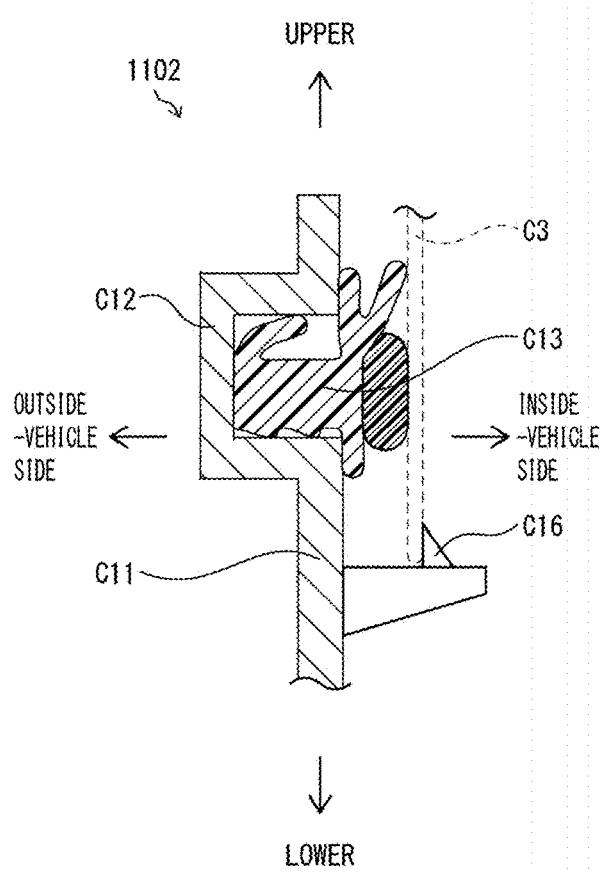
FIG. 11B is a cross-sectional view taken along 11B-11B in FIG. 11A.

The following description will discuss, with reference to FIGS. 10, 11A, and 11B, an example application in which the configurations of the groove 11 and the sealing member 20 of door hole cap 1 are applied. FIG. 10 is a view illustrating how an air outlet C1 is attached to a vehicle C. A reference sign 1101 of FIG. 11A is a view of the air outlet C1 as seen from the outside of the vehicle. A reference sign 1102 of FIG. 11B is a cross-sectional view taken along line 11B-11B indicated in FIG. 11A.

The configurations of the groove 11 and the sealing member 20 of the door hole cap 1 are applicable to, besides the door hole cap, various plate-shaped members to be attached to the vehicle C. In particular, the configurations are suitably applicable to a plate-shaped member that is attached to the vehicle C in a manner that requires water stopping performance. The air outlet C1 illustrated in FIG. 10 is an example of such a plate-shaped member.

The air outlet C1 is attached to an outside-vehicle side opening C3 of an air duct C2. The air duct C2 carries air from the internal space of the vehicle C. The outside-vehicle side opening C3 is formed on an inner side panel of a rear bumper C4 of the vehicle C. The air outlet C1 improves door closeability by, when a door of the vehicle C is closed, discharging air in order to reduce an increase in a pressure inside the vehicle C.

The air outlet C1 is attached to the outside-vehicle side opening C3 facing the outside of the vehicle C and thus needs to have water stopping performance. Conventionally, the water stopping performance has been secured by affixing a water stop seal made of, for example, urethane foam to a peripheral part of an air outlet, in a case where the air outlet is attached to the outside-vehicle side opening C3. Such a conventional method includes steps of positioning and bonding the water stop seal, and the steps cause an increase in manufacturing costs. This problem can be solved by applying, to the air outlet C1, the configurations of the groove 11 and the sealing member 20 of the door hole cap 1.

As illustrated in an example indicated by the reference sign 1101 of FIG. 11A, the air outlet C1 includes a plate-shaped body C11 and a sealing member C13. A groove C12 to be formed in the plate-shaped body C11 and the sealing member C13 to be inserted in the groove C12 can be described by using the respective descriptions of the groove 11 and the sealing member 20 of the door hole cap 1. The groove C12 of the air outlet C1 includes a paralleling part C14 that corresponds to the wide part 17 of the door hole cap 1.

The plate-shaped body C11 includes a discharge valve C15 and a fixing member C16, in addition to the groove C12. The discharge valve C15 is normally closed. When air pressure is applied from the inside of the vehicle through the air duct C2, the discharge valve C15 opens and discharges the air out of the vehicle.

The fixing member C16, which is locked in a peripheral end part of the outside-vehicle side opening C3, fixes the air outlet C1 to the outside-vehicle side opening C3, as illustrated in an example indicated by the reference sign 1102 of FIG. 11B. When the air outlet C1 is fixed to the outside-vehicle side opening C3, the sealing member C13 abuts on an outer surface of the outside-vehicle side opening C3. This brings about high water stopping performance.

The sealing member C13 can be manufactured by, for example, extrusion molding. It is therefore possible to manufacture the sealing member C13 at a lower cost than to manufacture a conventional water stop seal. Further, attachment of the sealing member C13 to the plate-shaped body C11 is completed only by a simple and easy operation of inserting the sealing member C13 into the groove C12. Therefore, with the configuration in which the plate-shaped body C11 has the groove C12 and the sealing member C13 is inserted into the groove C12, it is possible to both reduce costs for manufacturing the air outlet C1 and secure high water stopping performance.

[Main Points]

In order to solve the above problems, a door hole cap in accordance with an aspect of the present invention is provided. The door hole cap is to be attached to a door hole that is formed in a door inner panel of a vehicle, and includes a capping member for covering the door hole from an inside of the vehicle, the capping member having a groove that is recessed toward the inside of the vehicle; and a sealing member to be attached to the groove, the groove being formed along an entire perimeter of a first peripheral part that is a peripheral part of the capping member, the sealing member including a main body section to be inserted into the groove, a first sealing section which extends from an outside-vehicle side end of the main body section toward an outside of the vehicle and which abuts on an inside-vehicle side surface of the door inner panel, and a groove touch section which extends, from a position further inside the vehicle than the outside-vehicle side end of the main body section, toward at least one inner surface of the groove and which abuts on the at least one inner surface.

With this configuration, an attachment of the sealing member to the capping member is completed only by a simple and easy operation of inserting the sealing member into a groove of the capping member. This eliminates the need for operations, including positioning and bonding, that are required when a spongy material or the like are affixed to the door hole cap. Further, manufacturing variations depending on proficiency is less likely to occur. In addition, in a case where a fault occurs only in the sealing member after the sealing member is attached to the capping member, it is possible to readily replace the sealing member alone. This enables reduced manufacturing costs of the door hole cap.

In this configuration, the first sealing section that has been attached to the first peripheral part of the door hole cap abuts on the door inner panel. It is therefore possible to both maintain water stopping performance of the door hole cap and reduce the manufacturing costs.

According to the door hole cap in accordance with an aspect of the present invention, the sealing member can include lip sections which extend from the outside-vehicle side end of the main body section toward respective second peripheral parts that are respective peripheral parts on both sides of the groove and which abut on the respective second peripheral parts from a direction of the outside of the vehicle.

With this configuration, the lip sections abut, from the direction of the outside of the vehicle, the respective second peripheral parts that are respective peripheral parts on both sides of the groove. This produces a state in which the lip sections cover the groove. The lip sections therefore enable a reduction in entry of rainwater or the like into the groove. Consequently, the sealing member which has the lip sections improves water stopping performance of the sealing member in comparison with the sealing member which does not have lip sections.

Additionally, with this configuration, the lip sections abut on the respective second peripheral parts on both sides of the groove, and therefore structurally support, from both sides, the sealing member that has been attached to the groove. Consequently, the sealing member having the lip sections is capable of being attached to the groove in a more stable position than the sealing member not having the lip sections.

According to the door hole cap in accordance with an aspect of the present invention, the sealing member can further include a second sealing section which extends from a position on one of the lip sections that is closer to an edge of the door hole cap than the other, the position being closer to the main body section than is a tip of the one of the lip sections, and extends toward the inside-vehicle side surface of the door inner panel and which abuts on the inside-vehicle side surface.

In this configuration, the sealing member includes the second sealing section that abuts on the door inner panel. This makes it possible to effectively prevent, by both the first sealing section and the second sealing section, rainwater or the like from entering a vehicle after reaching the sealing member. The sealing member having the second sealing section therefore improves water stopping performance in comparison with the sealing member not having the second sealing section.

Further, the second sealing section extends from one of the lip sections. Accordingly, when the second sealing section abuts on the door inner panel, a force exerted in a direction from the door inner panel to the inside of the vehicle acts on the lip sections via the second sealing section. This causes the lip sections to be firmly pressed against the second peripheral parts from the direction of the outside of the vehicle. It is therefore possible to effectively prevent entry of rainwater or the like into the inside of the groove.

According to the door hole cap in accordance with an aspect of the present invention, the capping member can include, as a part of the groove, a paralleling part in which one end part and the other end part of the groove face each other and are arranged in parallel in a plane in which the groove of the capping member is formed. In a part of the paralleling part, the one end part and the other end part are connected to each other, and the groove is therefore wider at the part than at a remainder of the groove.

In this configuration, the paralleling part is formed in the groove included in the capping member. In a case where the paralleling part is not formed in the groove, it may be impossible for end portions of the sealing member to abut on each other in a manner that secures water tightness, due to manufacturing variations. This may cause the first peripheral part to have a portion which is poorly sealed by the sealing member. Conversely, in the capping member, both end portions of the sealing member are attached to the paralleling part so as to be partially arranged in parallel. This makes it possible to prevent generation of the portion which is poorly sealed.

Further, the grooves are connected in a part of the paralleling part, whereas the grooves are not connected in the other parts of the paralleling section and the two grooves are arranged in parallel. This configuration makes it possible to reduce a possibility of entry, by capillary action, of rainwater or the like into the groove, even in a case where a narrow passage is formed by the sealing member arranged in two rows that abut on each other and the door inner panel in the part of the paralleling part in which the end parts of the groove are connected. This configuration improves water stopping performance of the door hole cap in comparison with a configuration in which the grooves are connected throughout the paralleling part.

In the paralleling section in which the grooves are connected to each other, it is preferable to first attach a portion, of the sealing member, to be located on the door hole side. This causes the second sealing section to be folded between the first sealing section and the groove touch section, and makes it possible to also cause the first sealing sections, of the two rows of the sealing member that abut on each other, to abut on each other in the paralleling part in which the grooves are connected to each other. This further improves water stopping performance.

According to the door hole cap in accordance with an aspect of the present invention, the first sealing section can be softer than the main body section. With this configuration, the first sealing section is flexibly deformed and is likely to come into contact with the door inner panel, when pressed against the door inner panel. Conversely, the main body section is less likely to be deformed because the main body section is less flexible than the first sealing section. It is therefore possible to both easily keep the sealing member stably attached to the groove and achieve high water stopping performance.

A sealing member in accordance with an aspect of the present invention is to be attached to a groove in a door hole cap to be attached to a door hole that is formed in a door inner panel of a vehicle, the groove being formed along an entire perimeter of a first peripheral part and being recessed toward an inside of the vehicle, the first peripheral part being a peripheral part of a capping member for covering the door hole from the inside of the vehicle, the sealing member comprising: a main body section to be inserted into the groove; a first sealing section which extends from an outside-vehicle side end of the main body section toward the outside of the vehicle and which abuts on an inside-vehicle side surface of the door inner panel; and a groove touch section which extends, from a position located further inside the vehicle than the outside-vehicle side end of the main body section, toward at least one inner surface of the groove and which abuts on the at least one inner surface.

[Supplementary Note]

The present invention is not limited to the above-described embodiment and variations, but can be altered by a skilled person in the art within the scope of the claims. An embodiment derived from a proper combination of technical means each disclosed in a different embodiment or variation is also encompassed in the technical scope of the present invention.

REFERENCE SIGNS LIST 1, 2, 3, 4, 5: Door hole cap
10, 101, 102, 103: Capping member
11: Groove
12: First peripheral part
13: Second peripheral part
14: One end part
15: Another end part
16: Paralleling section
17: Wide section (part of paralleling part)
20, 201, 202: Sealing member
21, 211: Main body section
22, 221: First sealing section
23: Groove touch section
24: Lip section
25: Second sealing section
D1: Door inner panel
D2: Door hole

The invention claimed is:

1. A sealing member comprising:
a main body having a generally rectangular shape in cross-section;
a first sealing member that extends from a short end of the main body in a first direction, the first sealing member is made of a foamed material wherein a width of the main body is approximately equal to a width of the first sealing member;
a groove touch member that extends from a side of the main body in a second direction perpendicular to the first direction; and wherein the groove touch member extends from the main body in the second direction beyond an extent the first sealing member extends from the main body in the second direction;
a lip member positioned at the short end of the main body; the lip member extends from the main body
in the second direction; and
a second sealing member that extends from the lip member at a position closer to the main body than a tip of the lip member; wherein a component of the second sealing member extends in the first direction.

2. The sealing member of claim 1, wherein the width of the first sealing member is greater than a width of the second sealing member.

3. The sealing member of claim 1, wherein the lip member extends from the side of the main body.

4. The sealing member of claim 1, wherein the first sealing member is softer than the main body.

* * * * *